United States Patent [19]

Foster et al.

[11] Patent Number: 5,056,867
[45] Date of Patent: Oct. 15, 1991

[54] HEAD RESTRAINT ADJUSTMENT MECHANISM

[75] Inventors: Scott V. Foster, Northville; Anthony J. Fecteau, Roseville, both of Mich.

[73] Assignee: Hoover Universal, Inc., Plymouth, Mich.

[21] Appl. No.: 539,713

[22] Filed: Jun. 18, 1990

[51] Int. Cl.⁵ .............................................. A47C 7/38
[52] U.S. Cl. .................................................. 297/410
[58] Field of Search ............................... 297/410, 391; 248/188.5, 118.3, 326, 333; 403/329, 187

[56] References Cited

U.S. PATENT DOCUMENTS

| | | | |
|---|---|---|---|
| 3,304,035 | 2/1967 | Davis | 248/188.5 |
| 3,512,833 | 5/1970 | Sugiura | 297/410 |
| 3,542,429 | 11/1970 | Inoue | 297/410 |
| 4,545,618 | 10/1985 | Kitamura | 297/410 |
| 4,854,642 | 8/1989 | Vidwans et al. | 297/391 |

Primary Examiner—Kenneth J. Dorner
Assistant Examiner—Milton Nelson, Jr.
Attorney, Agent, or Firm—Harness, Dickey & Pierce

[57] ABSTRACT

An adjustment mechanism for a head restraint assembly in which the head restraint is supported on one or more posts having a plurality of V-shaped detent notches for engagement by a spring clip to hold the head restraint in place. The spring clip includes a V-shaped contacting portion having two legs which concurrently contact the surfaces of the detent notches to hold the head restraint in place. The lowest notch is a locking notch having an upper inclined surface and a lower radial surface while the lower surface of the spring clip contacting portion includes a cutout the upper edge of which contacts the radial surface of the locking notch to prevent removal of the head restraint post. The outer edge of the V-shaped contacting portion of the spring clip is rounded to reduce abrasion of the post surface coating.

7 Claims, 3 Drawing Sheets

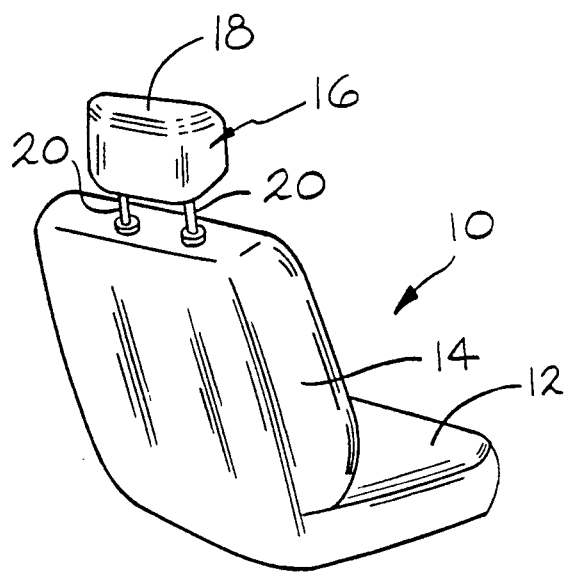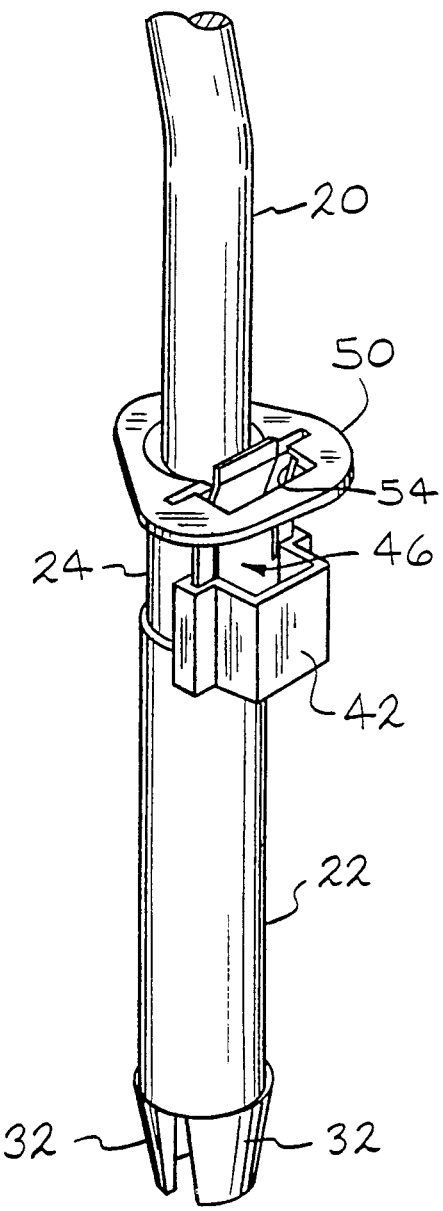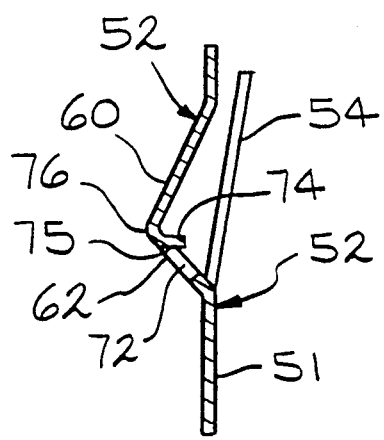
FIG. 1
FIG. 3A
FIG. 2

HEAD RESTRAINT ADJUSTMENT MECHANISM

BACKGROUND OF THE INVENTION

This invention relates to an automotive seat head restraint assembly and in particularly to a locking mechanism for the head restraint assembly that provides detents for various extended positions of the head restraint and a means for preventing inadvertent removal of the head restraint pad from the associated seat.

Motor vehicle manufacturers provide head restrains for occupant seats as a comfort and safety feature. Head restraints provide a surface upon which the seat occupants can rest their heads against and also provide occupant protection by controlling rearward excursion of the occupant's head in rear impact situations.

Head restraints can be categorized as several different general types. The so-called integral head restraint or "high back" seat has a seat back with a vertical extension forming a head restraint. Another type of seat has a separate head restraint pad extending upwardly above the seat back and frequently has a mechanism for allowing the vertical position of the pad to be adjusted and positioned for a particular seat occupant. Vertical adjustment of these types of head restraints is typically accomplished by providing one or more posts extending from the head restraint pad into the seat back, with a mechanism mounted within the seat back for allowing the position of the head restraint pad to be adjusted and set at a desired position. As a means of preventing inadvertent removal of the head restraint from the seat back, which could occur during adjustment, a latch or stop may be provided which limits the upward extend of adjustment of the head restraint pad. Means are further often provided for unlatching the stop to enable the head restraint pad to be removed from the seat back for vehicle repairing, servicing, retrimming, etc.

While numerous designs for head restraint assemblies of the above type are known, manufacturers of motor vehicle components are constantly striving to increase productivity by simplifying seat assembly. One method of locking the head restraint in different vertical positions uses tubular plastic guides having a transverse spring loaded steel plate engaging notches in the post to hold the head restraint in place. This mechanism contains several individual components requiring considerable assembly time.

Another problem with this type of locking mechanism is that the sharp edge of the spring loaded plate scrapes the coating off the head restraint post. The most durable coating found has been chrome. However, chrome is often not acceptable or desired by the vehicle designer. Instead, a phosphate and oil coating is often chosen because, when scratched, it is not as noticeable as with other coatings. However, a phosphate and oil coating has a dull finish and the resultant appearance is also often not desired. Furthermore, because of the oil base in the coating, extra care must be used in order to keep the oil from soiling the seat trim covers. A major disadvantage with a phosphate and oil coating is the varied efforts required to raise and lower the head restraint. This variation in effort is largely due to the inconsistent thickness of the phosphate being applied to the head restraint post. Since the spring loaded locking plate is the primary contributor to the adjustment effort, the amount of coating built up in the notches can greatly vary the effort required to adjust the head restraint. When there is a large amount of phosphate built up in the notches, the plate sticks and more force is required to adjust the head restraint.

Accordingly, it is an object of the present invention to provide a head restraint adjustment mechanism that reduces the number of individual components in the mechanism and the time required to assemble the mechanism.

It is a further objective of the present invention to eliminate scratching of the head restraint post coating to enable a wider range of coatings to be used on the post.

It is yet another objective to provide a head restraint locking mechanism in which the adjustment efforts are repeatable from one mechanism to another and in which the particular coating of the head restraint post has little or no effect on the adjustment effort.

The locking mechanism of the present invention is designed with a generally V-shaped spring clip for engagement in like shaped notches in the head rest post. Instead of a sharp edge, the spring clip has a rounded edge engaging the post to reduce or eliminate scratching of the coating. The spring clip includes a cut out portion that catches a locking notch having a lower square edge to keep the head restraint from being inadvertently pulled out of the seat back.

The spring clip is held within a housing molded in a tubular plastic bushing. The bushing is inserted into a metal sleeve attached to the seatback frame. The head restraint post is inserted into the bushing where the spring clip engages the notches in the head restraint post.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a vehicle seat assembly containing the head restraint locking mechanism of the present invention.

FIG. 2 is a perspective view of the head restraint locking mechanism as assembled.

FIG. 3A is an enlarged sectional view of the spring clip as seen from substantially the line 3A—3A of FIG. 3.

DETAILED DESCRIPTION OF THE INVENTION

Figure 3:
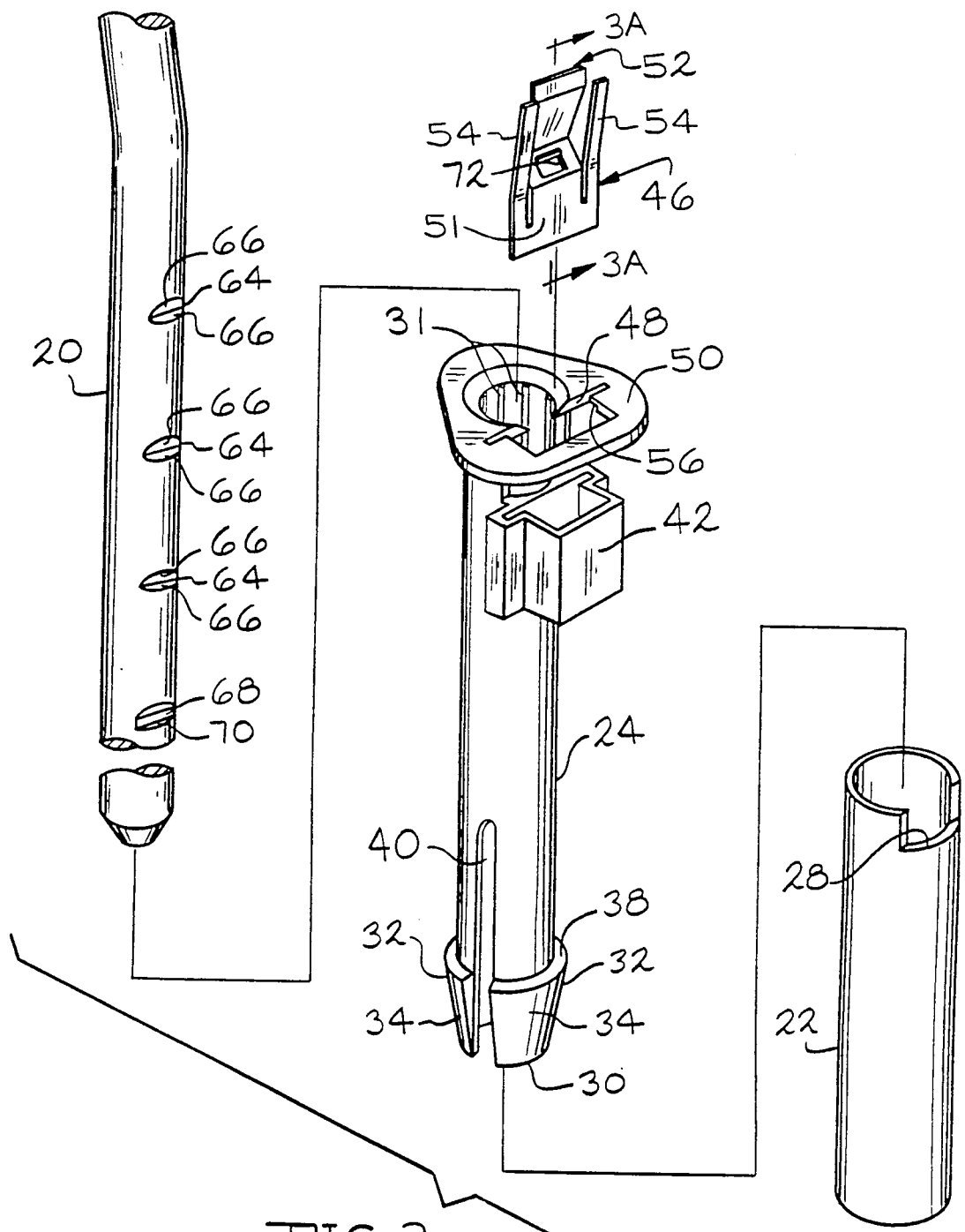
FIG. 3 is an exploded perspective view of the head restraint locking mechanism.

The motor vehicle seat assembly designated by reference number at 10 in FIG. 1 includes the head restraint adjustment mechanism of the present invention. Seat 10 includes a bottom cushion 12 and a seat back 14. Head restraint assembly 16 is carried by seat back 14 and has a pad 18 and a pair of downwardly extending mounting posts 20.

FIGS. 2-7 illustrates the mechanism used to support mounting posts 20 within the seat back 14 and to adjust the position of pad 18. A head restraint sleeve 22 is attached to a seat back frame member 26 (shown in FIG. 4) to support a plastic bushing 24 within the seat back 14. The upper end of sleeve 22 is provided with a notch 28 to ensure proper alignment of bushing 24 relative to head restraint post 20.

Figure 4:
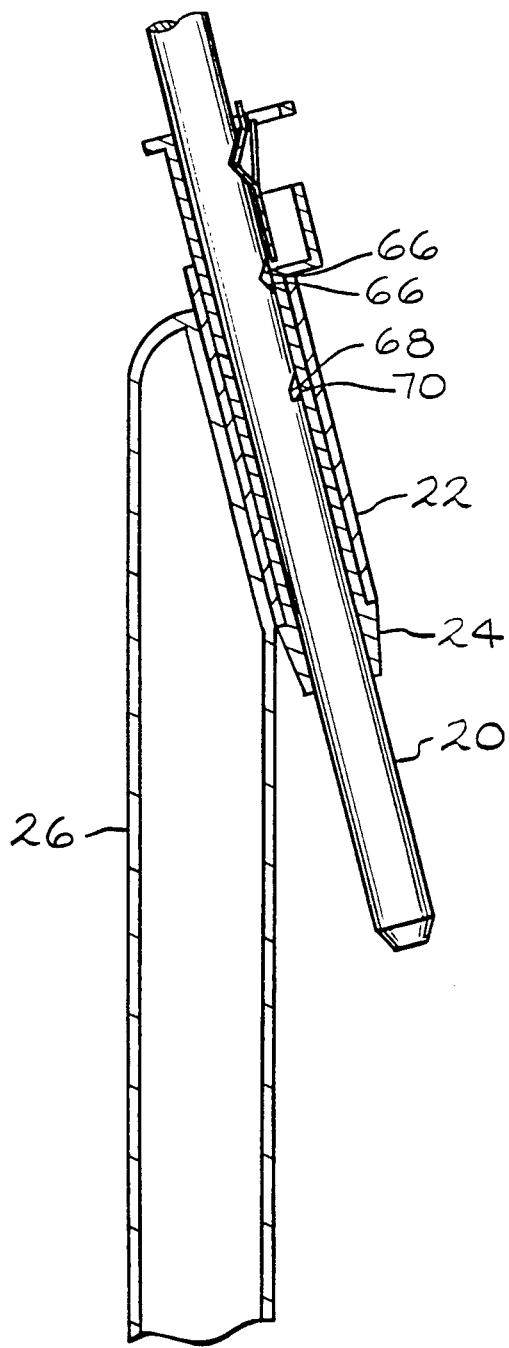
FIG. 4 is a sectional view of the head restraint locking mechanism as assembled.
Figure 5:
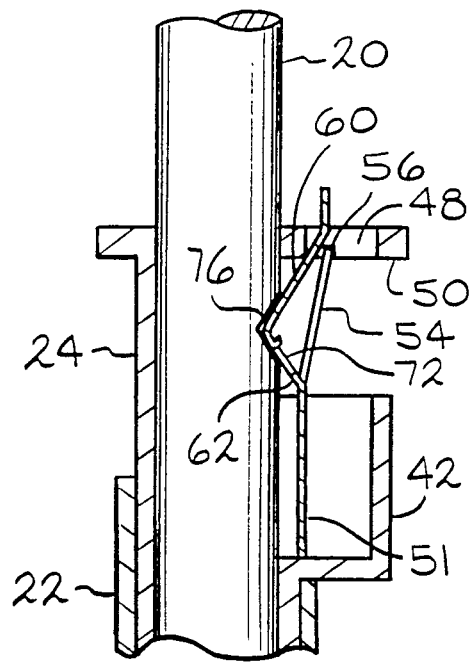
FIG. 5 is an enlarged partial sectional view of the head restraint locking mechanism showing the mechanism in an intermediate adjusted position.
Figure 6:
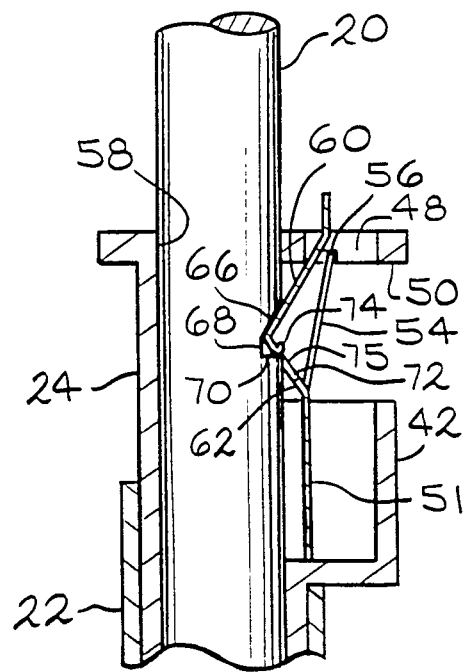
FIG. 6 is an enlarged partial sectional view similar to FIG. 5 showing the mechanism in the maximum extended position.

The features of bushing 24 are best explained with particular reference to FIGS. 3, 5 and 6. Bushing 24 is generally tubular in shape having an internal bore 58 therethrough. The inner surface of the bore forms a number of longitudinally extending ribs 31 for engagement with a post 20 inserted into bore 58. The lower end 30 of bushing 24 is formed by a pair of downwardly extending legs 32, each having a ramped side surface 34 and radial shoulder 38. Longitudinal slots 40 enable legs 32 to flex radially. The bushing 24, near its upper end, includes a radially extending housing 42. During seat assembly, bushing 24 is inserted into head restraint sleeve 22. The ramped side surfaces 34 of the bushing cause legs 32 to deflect inwardly until the bushing reaches its installed position best shown in FIG. 4. Bushing 24 is locked in position when the housing 42 is seated in notch 28 and the lower ends of legs 32 extend below sleeve 22 so that the legs 32 move outward to their normal positions engaging shoulder 38 with the sleeve lower end.

A spring retainer clip 46 is inserted through the opening 48 in radial flange 50 at the upper end of bushing 24 and into the housing 42 positioned directly below opening 48. Spring clip 46 includes a body portion 51, a cantilevered retaining arm 52 and a pair of cantilevered fingers 54. When the spring clip 46 is fully seated in housing 42, the fingers 54 are seated in notch 56 in the under side of radial flange 50 to securely hold the spring clip in position. Once installed, the arm 52 of the spring clip is resiliently biased radially inwardly into the diameter of bore 58 of bushing 24. The retaining arm 52 has a V-shaped contacting portion formed by two legs 60 and 62 as shown in FIGS. 5 and 6.

Head restraint mounting post 20 includes a number of regularly spaced V-shaped detent notches 64 along the post having upper and lower inclined ramp surfaces 66 as shown in FIGS. 3 and 4. The lowermost notch is a locking notch 68 formed by a radially extending lower surface 70 and an upper ramp surface 66.

When post 20 is moved longitudinally in bushing bore 58, the retaining arm 52 of the spring clip is forced radially outwardly to permit the post to be moved longitudinally within the bore. Arm 52 engages each of the notches 64 to provide a detent at indexed positions of the post. Ramp surfaces 66 of the notches allow the post to be moved by longitudinal loading of the post by pushing or pulling. The ramp surfaces force the arm 52 outward to enable the post to be moved. When engaging a notch 64, the outer engaging surfaces of legs 60 and 62 concurrently contact the upper and lower ramp surfaces 66 of the notches to prevent movement of the post while at a detent position. By concurrently engaging both ramp surfaces 66 of the detent notches, vibration and rattling of the post is prevented.

In accordance with a principal aspect of this invention, the lower leg 62 is provided with a central cut out 72. The upper edge 74 of the cut out is turned in, forming a radial surface 75 for engagement with the radial surface 70 of locking notch 68 as shown in FIG. 6. Unintended removal of the post 20 from bushing 24 is prevented by the engagement of the radial surface 70 with the spring clip edge surface 75. By concurrently engaging both surfaces of the locking notch, vibration and rattling of the post is prevented.

To enable intentional removal of the post 20, the arm 52 of the spring clip extends upward above the radial flange 50 of the bushing. A screw driver or other tool can be used to force the engaging portion 52 outward to release the edge surface 75 from radial surface 70 to enable removal of post 20.

The outer surface of the arm 52 at the apex 76 of the V-shaped contacting portion is rounded to minimize scratch and abrasion of the surface coating on post 20. This enables the use of less abrasion resistant coatings on post 20, increasing the range of surface coating options available to the vehicle designer.

The force necessary to move the head restraint up or down is principally determined by the biasing force of the retaining arm 52 of spring clip 46. The uniformity or lack of uniformity of the post surface coating does not affect the force necessary to move the post. Ribs 31 in the bushing bore also aid in controlling adjustment force. By providing only a small number of contact points of the bushing with the post, it is easier to produce bushings and posts having a repeatable sliding friction within normal production tolerances. The roundness of both the post and sleeve bore no longer affect the sliding friction.

For vehicle seat designs using more than one post 20, such is shown in FIG. 1, an identical adjustment mechanism assembly of the type described above may be used for each post. Alternatively, one of the post receiving bushings may act solely as a guide without a spring clip to retain the head restraint or means to prevent inadvertent removal of the post.

The head restraint mechanism meets the above objectives for the invention. The number of individual components in the mechanism is reduced as compared to many prior head restraint mechanisms. Assembly time of the mechanism is also greatly minimized. The spring clip produces mechanisms in which the adjustment force is repeatable in large production quantities and is not susceptible to variations in the surface coating on the head restraint post.

It is to be understood that the invention is not limited to the exact construction illustrated and described above, but that various changes and modifications may be made without departing from the spirit and scope of the invention as defined in the following claims.

We claim:

1. A mechanism for enabling a head restraint pad to be moved with respect to a seat, comprising:
   at least one post connected to and supporting the head restraint pad, said post forming a plurality of spaced detent notches on its outer surface, said notches being generally Vshaped and extending transversely of said post forming upper and lower inclined ramp surfaces, said post further forming a locking notch spaced below said detent notches, said locking notch having an upper inclined ramp surface similar to said detent notch upper ramp surfaces and a radially extending lower surface spaced below said inclined upper surface;
   a tubular bushing mounted to the seat and having an inside bore for receiving said post;
   a spring retainer carried by said bushing, said retainer having a body portion and a cantilevered retaining arm extending from said body portion, aid retaining arm including a V-shaped contacting portion having upper and lower inclined legs, the outer surafces of said legs forming upper and lower engaging surfaces of said retaining arm, said arm being resiliently biased into said bore and said legs being sized to enable said upper and lower engaging surafces to concurrently contact said upper and lower ramp surfaces respectively when one of said detent notches is aligned with said V-shaped contacting portion whereby said post is held in place, said ramp surfaces forcing said arm radially outward in response to longitudinal forces on said post to adjust the position of said head restrain; and said lower inclined leg of said V-shaped contacting portion having a cut out portion forming an upper edge engagable with the radially extending lower surface of said locking notch simultaneous with engagement of the upper inclined leg with the upper ramp surface of the locking notch to prevent unintended removal of said post from the seat.

2. The mechanism of claim 1 wherein the outer surface of the apex of said V-shaped contacting portion is rounded to reduce abrasion of said post as said post is moved.

3. The mechanism of claim 1 wherein said tubular bushing includes a radially extending flange about its upper end, said flange including an aperture in which said spring retainer is disposed and housing means beneath said aperture for holding said spring retainer.

4. The mechanism of claim 3 wherein said spring retainer further comprises means for holding said spring retainer in said housing.

5. The mechanism of claim 4 wherein said holding means comprises at least one cantilevered finger extending upward from said body portion and engaging a lower side of said radial flange holding said body portion firmly against said housing.

6. The mechanism of claim 1 wherein said inside bore includes a plurality of longitudinal ribs projecting radially inward and having rounded surfaces for engagement with said post to reduce friction between said bore and said post to facilitate sliding of said post therein.

7. The mechanism of claim 3 wherein said retaining arm extends above said radial flange for manipulation by a tool to deflect said arm outwardly to disengage said cutout portion upper edge from said locking notch radial lower surface to enable said post to be withdrawn from said bushing.

* * * * *